United States Patent [19]

Mizuta et al.

[11] Patent Number: 5,067,607
[45] Date of Patent: Nov. 26, 1991

[54] INTERMITTENT FEED SYSTEM

[75] Inventors: Akira Mizuta; Kazumi Kitamura, both of Kanagawa, Japan

[73] Assignee: Fuji Photo Film Co., Ltd., Kanagawa, Japan

[21] Appl. No.: 599,167

[22] Filed: Oct. 17, 1990

[30] Foreign Application Priority Data

Oct. 18, 1989 [JP] Japan .................................. 1-270739

[51] Int. Cl.$^5$ .............................................. B65G 19/08
[52] U.S. Cl. ................................. 198/733; 198/735.3
[58] Field of Search ............. 198/717, 728, 733, 735.3

[56] References Cited

U.S. PATENT DOCUMENTS

| | | | |
|---|---|---|---|
| 1,418,572 | 6/1922 | Hoyt et al. ........................... | 198/733 |
| 2,828,851 | 4/1958 | Thomas ........................... | 198/733 X |
| 3,282,407 | 11/1966 | Schmermund ................... | 198/733 X |
| 4,019,624 | 4/1977 | Torres .............................. | 198/728 X |

Primary Examiner—Joseph E. Valenza
Assistant Examiner—Tuan N. Nguyen
Attorney, Agent, or Firm—Sughrue, Mion, Zinn, Macpeak & Seas

[57] ABSTRACT

An intermittent feed system for intermittently feeding a plurality of works in two rows in a predetermined direction has a pair of guide rails which extend in the predetermined direction in parallel to each other and spaced from each other in the direction of their widths. A single endless belt is disposed below the space between the guide rails and extends in the predetermined direction. A plurality of attachments are fixed to the endless belt at regular intervals to move together with the endless belt in the predetermined direction. Each attachment has a vertical base portion which projects upward through the space between the guide rails and a pair of arm portions which transversely project in opposite directions above the respective guide rails so that when the endless belt moves in the predetermined direction, each arm portion pushes the work placed on the corresponding guide rail in the predetermined direction along the guide rail.

2 Claims, 4 Drawing Sheets

INTERMITTENT FEED SYSTEM

BACKGROUND OF THE INVENTION

1. Field of the Invention

This invention relates to an intermittent feed system in which a plurality of pairs of works are fed by a single endless belt.

2. Description of the Prior Art

For example, when assembling a magnetic disk cartridge shown in FIG. 7, parts are incorporated in upper and lower shells 2a and 2b while the upper and lower shells 2a and 2b are intermittently, fed. The shells 2a and 2b can be intermittently fed for instance, by a rotary index table system or a rod feed system shown in FIGS. 8A and 8B. In the rod feed system 3 shown in FIGS. 8A and 8B, the upper and lower shells 2a and 2b are simultaneously fed in the direction of arrow A with each pair of upper and lower shells 2a and 2b arranged side by side in the direction perpendicular to the feeding direction. The shells 2a and 2b are positioned by pins 4 and intermittently fed in the direction of arrow A by box-like motions (a→b→c→d) of pins 4.

However this system is disadvantageous in that elements of the system is too large in number and it is difficult to reduce the plant investment or to increase the feeding speed.

In this conjunction, a belt feed system in which works are fed by an endless belt having attachments for positioning the works is preferable to the rod feed system. However, when the belt feed system is simply employed to feed the upper and lower shells 2a and 2b in assembly of the magnetic disk cartridge, a pair of endless belts are required, which is not preferable since the conveyor system occupies a large space.

Further when a plurality of upper and lower shells 2a and 2b are arranged in two rows and each pair of upper and lower shells are fed by a single endless belt disposed between the rows, the distance between the upper and lower shells 2a and 2b becomes large and, for example, when the parts are incorporated into the shells 2a and 2b by means of a linear assembling machine having a pick-and-place, the arm of the pick-and-place must be long. This is not preferable in view of increasing the assembling speed.

SUMMARY OF THE INVENTION

In view of the foregoing observations and description, the primary object of the present invention is to provide an intermittent feed system which can feed a plurality of pairs of works with a high efficiency by a single endless belt.

In accordance with the present invention, there is provided an intermittent feed system for intermittently feeding a plurality of works in two rows in a predetermined direction comprising a pair of guide rails which extend in the predetermined direction in parallel to each other and spaced from each other in the direction of their widths, a single endless belt which is disposed below the space between the guide rails and extends in the predetermined direction, and a plurality of attachments fixed to the endless belt at regular intervals to move together with the endless belt in the predetermined direction, each attachment comprising a vertical base portion which projects upward through the space between the guide rails and a pair of arm portions which transversely project in opposite directions above the respective guide rails so that when the endless belt moves in the predetermined direction, each arm portion pushes the work placed on the corresponding guide rail in the predetermined direction along the guide rail.

With this arrangement, the distance between the works in each pair may be substantially equal to the width of the base portion of the attachment which can be smaller than the width of the endless belt.

DESCRIPTION OF THE PREFERRED EMBODIMENT

Figure 7:
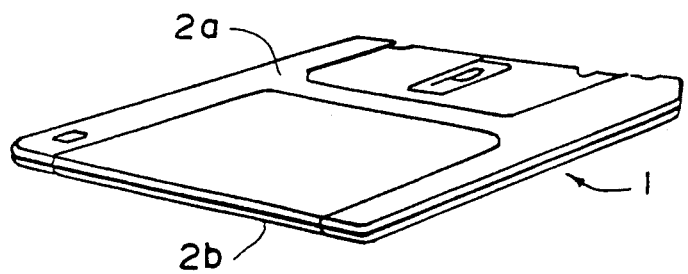
FIG. 7 is a view showing an example of a work.
Figure 8A:
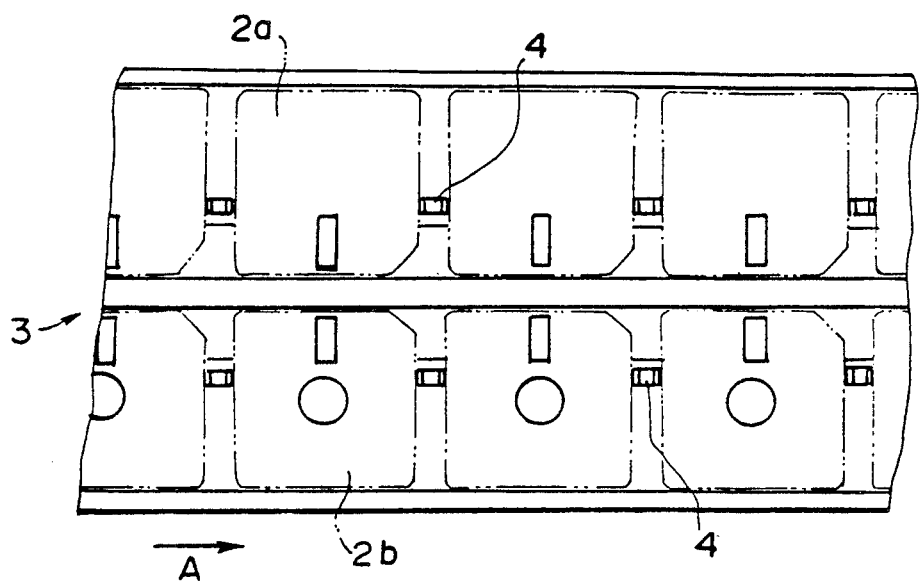
FIG. 8A is a plan view of a conventional feed system.
Figure 8B:
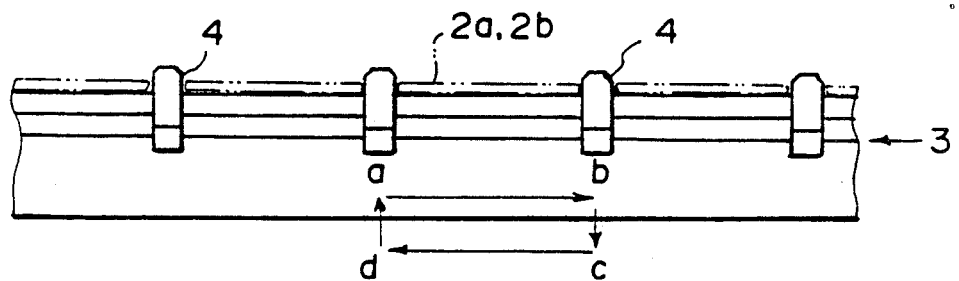
FIG. 8B is a side view of the conventional feed system.

In FIGS. 1 to 5B, an intermittent feed system 10 in accordance with an embodiment of the present invention is for feeding the upper and lower shells shown in FIG. 7 and comprises a pair of guide rails 30 which extend in a feeding direction (direction shown by arrow A) in parallel to each other and spaced from each other in the direction of their widths, and a single endless belt 11 which is disposed below the space between the guide rails 30 and extends in the feeding direction. The endless belt 11 is supported by belt guides 11a and is intermittently driven by a predetermined stroke S at one time. A plurality of attachments 12 are fixed to the endless belt 11 at regular intervals to move together with the endless belt 11 in the feeding direction. Each attachment 12 comprises a vertical portion which projects upward between the guide rails 30 and a pair of arm portions which extend in opposite directions from the top of the vertical portion above the respective guide rails 30. More particularly, each attachment 12 comprises a base portion 16 and a T-shaped portion 14 bolted to the top of the base portion 16. The T-shaped portion 14 has a pair of arms 14a which extend in opposite directions above the respective guide rails 30. Each arm 14a has an end portion which is positioned slightly above the upper surface of the guide rail 30 as clearly shown in FIG. 3, and pushes the shell placed on the guide rail 30 when the endless belt 11 moves in the feeding direction.

Figure 5A:
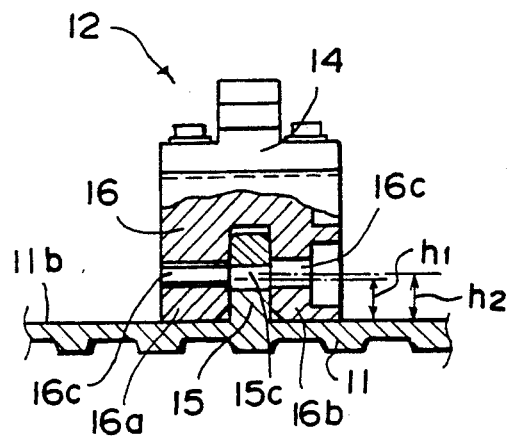
FIG. 5A is a front view partly in cross-section of the attachment.
Figure 5B:
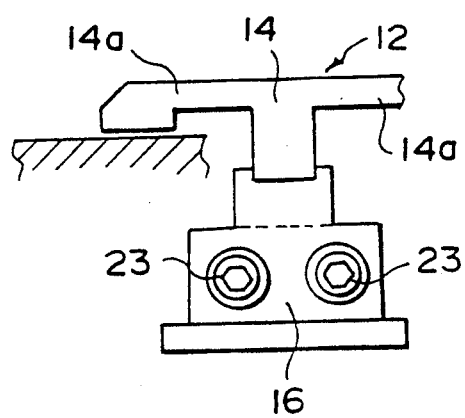
FIG. 5B is a side view partly in cross-section of the attachment.

As clearly shown in FIG. 5A, the base portion 16 has front and rear leg portions 16a and 16b spaced from each other. Each of the leg portions 16a and 16b is provided with a pair of transverse through holes 16c, each of the through holes 16c of each leg portion in alignment with one of the through holes 16c of the other leg portion. The endless belt 11 has a plurality of profiles 15 integrally formed thereon to project upward at regular intervals. Each profile 15 has a pair of through holes 15c each aligned with one of the through holes 16c in each of the leg portions. The base portion 16 is fixed to the profile 15 by a pair of pins 23 inserted into the aligned through holes 15c and 16c. The space between the leg portions 16a and 16b is substantially equal to the width of the profile 15. As shown in FIG. 5A, the distance h2 between the lower surface of the leg portions 16a and 16b and the horizontal axis of each through hole 16c is slightly larger than the distance h1 between the horizontal axis of each through hole 15c and the upper surface 11b of the endless belt 11. Accordingly, when the pins 23 are inserted into the through holes, the base portion 16 is pressed against the endless belt 11, whereby the base portions 16 is firmly fixed to the endless belt 11.

Figure 1:
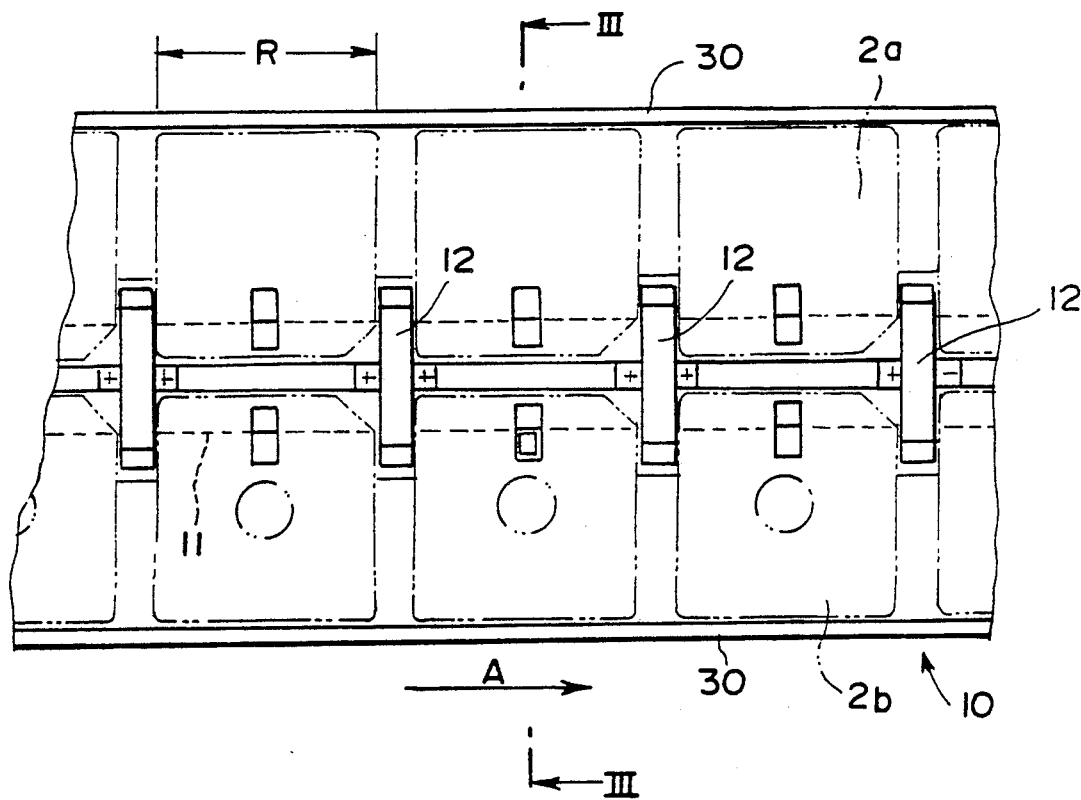
FIG. 1 is a fragmentary plan view showing an intermittent feed system in accordance with an embodiment of the present invention.
Figure 2:
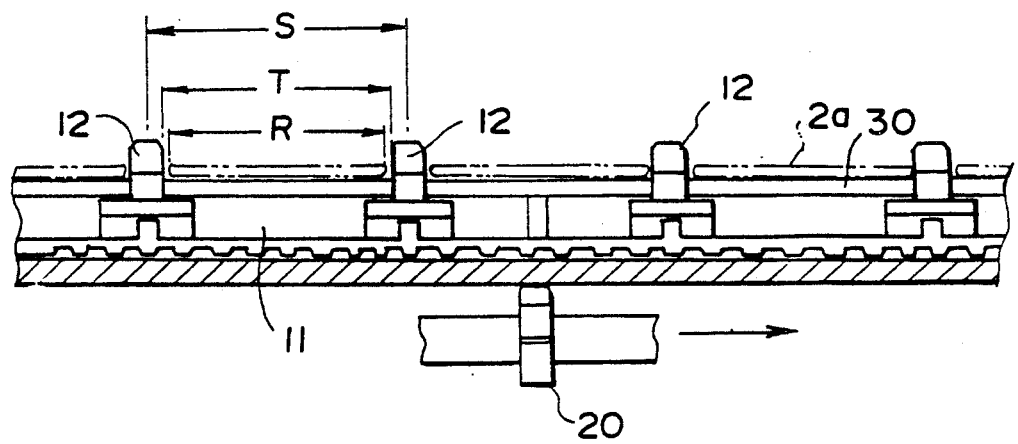
FIG. 2 is a fragmentary side view of the intermittent feed system.

Each of said guide rails 30 is provided with inner and outer guide walls 31a and 31b. As shown in FIG. 1, the upper shells 2a are placed on one of the guide rails 30 and the lower shells 2b are placed on the other guide rail 30. Each shell is roughly positioned by the arms 14a of a pair of adjacent attachments 12 in the longitudinal direction of the guide rail 30 and by the inner and outer guide walls 31a and 31b in the transverse direction of the guide rail 30. That is, the interval T of the attachments 12 is slightly (e.g., 1 mm) larger than the length R of the shell and the distance between the inner and outer guide walls 31a and 31b is slightly larger than the width of the shell. Accordingly, by placing the shell on the guide rail 30 between the attachments 12, the shell can be roughly positioned relative to the guide rail 30.

Figure 3:
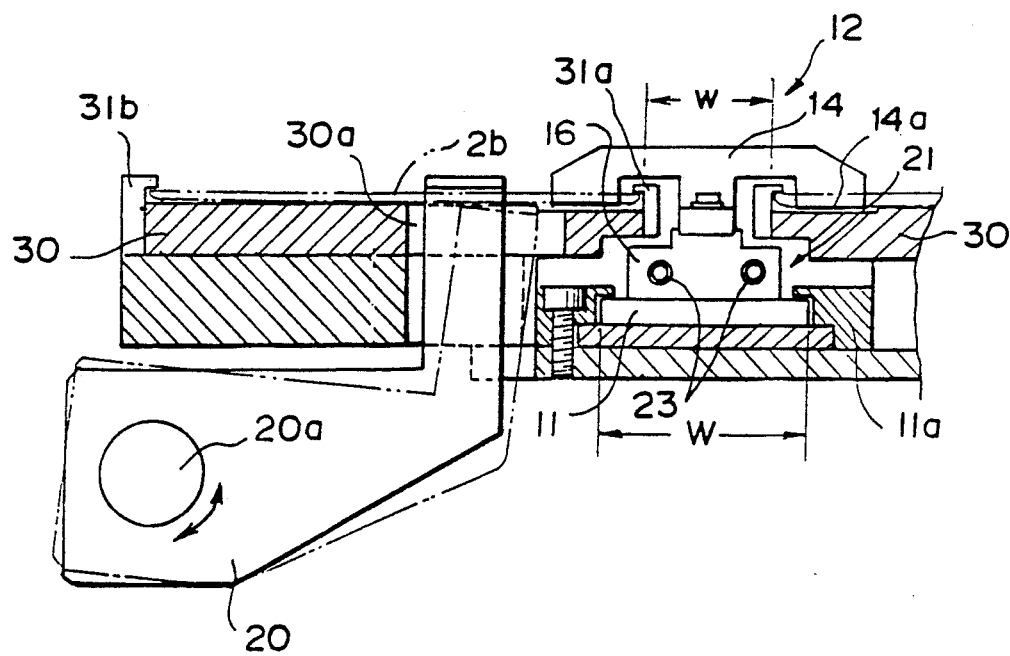
FIG. 3 is a cross-sectional view taken along line III—III in FIG. 1.
Figure 4:
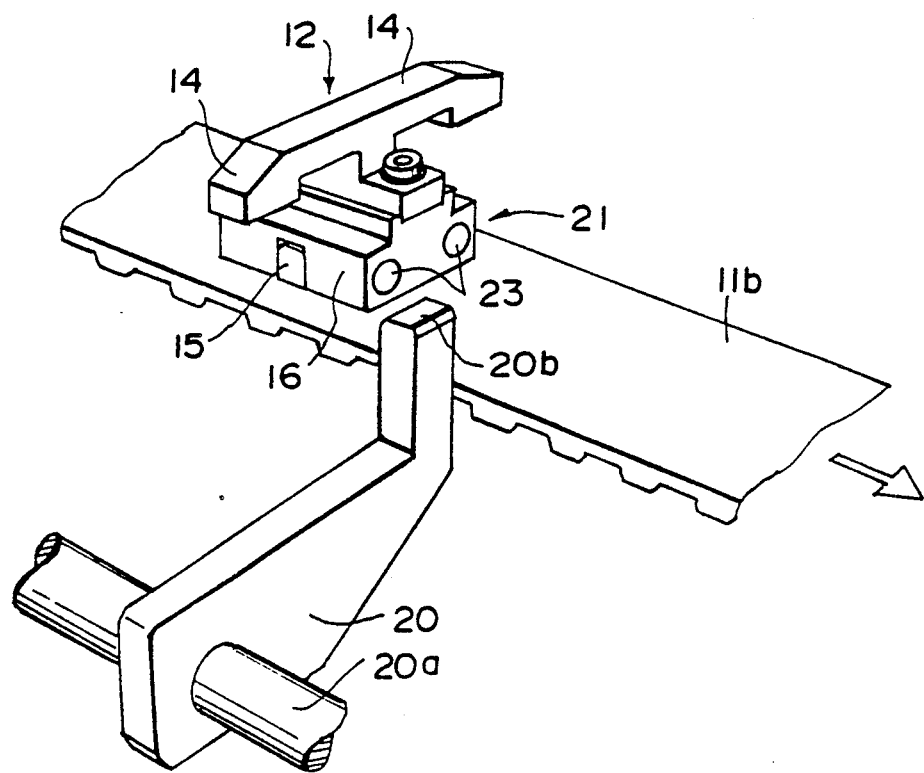
FIG. 4 is an enlarged perspective view of a part of the intermittent feed system.

A positioning lever 20 is provided on one side of each guide rail 30 (though only the positioning lever 20 for one of the guide rails 30 is shown in FIGS. 3 and 4) at an incorporating station where a part is incorporated into each shell. The positioning lever 20 is supported for vertical swinging motion about a shaft 20a. Each guide rail 30 is provided with an opening 30a at a part corresponding to the incorporating station. When the positioning lever 20 is swung upward, the tip 20b of the lever 20 is brought into engagement with the wall of the shell defining a window and finely positions the shell in order to facilitate incorporation of the part into the shell.

Now the operation of the feed system of this embodiment will be described, hereinbelow.

A plurality of shells 2a and 2b are placed on the guide rails 30 between the attachments 12 and are roughly positioned relative to the guide rail 30. The endless belt 11 is intermittently driven in the direction of arrow A, and accordingly, the attachments 12 are moved together with the endless belt 11, whereby the shells 2a and 2b are pushed by the arm 14a of the T-shaped portion 14 and fed in the direction of arrow A along the guide rails 30. When the endless belt 11 is stopped, the positioning lever 20 is swung upward at the incorporating station and finely positions the shells 2a and 2b which has been stopped at the station. Then the parts are incorporated into the shells 2a and 2b and then the positioning lever 20 is swung downward to the original position. Then the endless belt 11 is driven again.

As can be understood from the description above, in accordance with the embodiment described above, the space w between the guide rails or the space between the shells 2a and 2b placed on the guide rails 30 can be smaller than the width W of the endless belt 11. Accordingly, the arm of the pick-and-place may be small in length. In accordance with the present invention, the feeding speed can be about four times as high as that in the conventional rod feed system.

Figure 6:
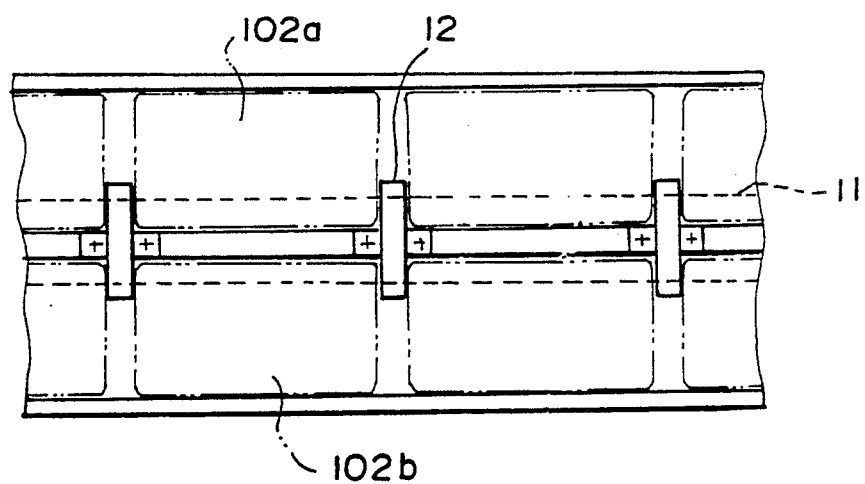
FIG. 6 is a fragmentary plan view showing an intermittent feed system in accordance with another embodiment of the present invention.

As shown in FIG. 6, the present invention can also be applied to a system which feeds an elongated rectangular works 102a and 102b.

We claim:

1. An intermittent feed system for intermittently feeding a plurality of works in two rows in a predetermined direction, comprising:
   a pair of guide rails which extend in the predetermined direction in parallel to each other and spaced from each other in the direction of their widths,
   a single endless belt which is disposed below the space between the guide rails and extends in the predetermined direction, and
   a plurality of attachments fixed to the endless belt at regular intervals to move together with the endless belt in the predetermined direction, each attachment comprising a vertical base portion which projects upward through the space between the guide rails and a pair of arm portions which transversely project in opposite directions above the respective guide rails so that when the endless belt moves in the predetermined direction, each arm portion pushes the work placed on the corresponding guide rail in the predetermined direction along the guide rail wherein each of said attachments is fixed to the endless belt by way of a profile which is fixed to the endless belt and is provided with a horizontal through hole, and said base portion of the attachment has a pair of leg portions which are spaced from each other and are provided with through holes extending horizontally in alignment with each other, the base portion being positioned on the endless belt so that the leg portions are on opposite sides of the profile with the through holes of the leg portions and the profile in alignment with each other and fixed to the profile by means of a pin member which is inserted into the through holes, the distance between the through holes of the leg portions and the lower surface of the leg portions being slightly larger than the distance between the through hole of the profile and the upper surface of the endless belt so that the leg portions are pressed against the endless belt when the pin member is inserted into the through holes.

2. An intermittent feed system as defined in claim 1 in which the space between the guide rails is smaller than the width of said endless belt.

* * * * *